(12) United States Patent
Shimota et al.

(10) Patent No.: US 10,648,741 B2
(45) Date of Patent: May 12, 2020

(54) VEHICLE HEAT EXCHANGE APPARATUS

(71) Applicant: Honda Motor Co., Ltd., Tokyo (JP)

(72) Inventors: Yuya Shimota, Wako (JP); Hiroshi Takei, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/990,386

(22) Filed: May 25, 2018

(65) Prior Publication Data

US 2018/0347909 A1    Dec. 6, 2018

(30) Foreign Application Priority Data

Jun. 1, 2017    (JP) ................. 2017-109479

(51) Int. Cl.

| F28D 1/02 | (2006.01) |
| B60R 19/48 | (2006.01) |
| F16H 57/04 | (2010.01) |
| B60K 11/04 | (2006.01) |
| B60K 11/08 | (2006.01) |
| F28D 21/00 | (2006.01) |

(52) U.S. Cl.
CPC ............ *F28D 1/0233* (2013.01); *B60K 11/04* (2013.01); *B60K 11/08* (2013.01); *B60R 19/48* (2013.01); *F16H 57/0417* (2013.01); *B60R 2019/486* (2013.01); *B60Y 2306/05* (2013.01); *F28D 2021/0089* (2013.01)

(58) Field of Classification Search
CPC ........ B60R 2019/486; B60R 2019/527; B60K 11/04; B60K 11/06; B60K 11/08; F16H 57/0417; F28D 1/0233

USPC ..................................... 165/41, 44
See application file for complete search history.

(56) References Cited

U.S. PATENT DOCUMENTS

| 4,566,407 | A | * | 1/1986 | Peter ...................... | B60K 11/08 |
| | | | | | 123/41.48 |
| 9,308,914 | B1 | | 4/2016 | Sun et al. | |
| 2006/0102109 | A1 | * | 5/2006 | Becker ................... | B60K 11/08 |
| | | | | | 123/41.48 |
| 2007/0068716 | A1 | * | 3/2007 | Kunikata ............... | B60K 11/04 |
| | | | | | 180/68.4 |
| 2012/0224611 | A1 | | 2/2012 | Ajisaka | |
| 2013/0134740 | A1 | | 5/2013 | Hirose | |

(Continued)

FOREIGN PATENT DOCUMENTS

| EP | 2489537 A1 * | 8/2012 | ............. B60K 11/04 |
| JP | 2000177406 A | 6/2000 | |

(Continued)

*Primary Examiner* — Tho V Duong
(74) *Attorney, Agent, or Firm* — Duft & Bornsen, PC

(57) ABSTRACT

A vehicle heat exchange apparatus, including: a heat exchanger provided rearward of a front bumper formed with an air intake port, and having an air inlet member on a front face of the heat exchanger; and a duct member provided between the front bumper and the heat exchanger, and forming a passage for passing cooling air from the air intake port of the front bumper to the air inlet member of the heat exchanger, wherein the duct member has: a first intake port introducing air from a vehicle front side into the passage through the air intake port provided in the front bumper; a second intake port introducing air from a vehicle lower side into the passage; and an outlet port opened at an end portion of the passage and facing the air inlet member of the heat exchanger.

10 Claims, 7 Drawing Sheets

(56) References Cited

U.S. PATENT DOCUMENTS

| | | | | |
|---|---|---|---|---|
| 2013/0180789 A1* | 7/2013 | Maurer | ............... | B60K 11/08 180/68.1 |
| 2014/0138077 A1* | 5/2014 | Ajisaka | ............... | B60K 11/04 165/287 |
| 2014/0291056 A1 | 10/2014 | Takanaga et al. | | |
| 2017/0369014 A1* | 12/2017 | Goldsberry | ............ | B60R 19/52 |

FOREIGN PATENT DOCUMENTS

| | | |
|---|---|---|
| JP | 2008049815 A | 3/2008 |
| JP | 2012017036 A | 1/2012 |
| JP | 2013107469 A | 6/2013 |
| JP | 2015128971 A | 7/2015 |
| WO | 2011151917 A1 | 12/2011 |
| WO | 2013161010 A1 | 10/2013 |

* cited by examiner

VEHICLE HEAT EXCHANGE APPARATUS

CROSS-REFERENCE TO RELATED APPLICATION

This application is based upon and claims the benefit of priority from Japanese Patent Application No. 2017-109479 filed on Jun. 1, 2017, the content of which is incorporated herein by reference.

BACKGROUND OF THE INVENTION

Field of the Invention

This invention relates to a vehicle heat exchange apparatus which has an air-cooled heat exchanger mounted on a vehicle.

Description of the Related Art

Apparatuses of this type are known that comprise an oil cooler serving as a heat exchanger installed forward of a front wheel housing and have a cooling airflow intake structure adapted to guide cooling airflow introduced through a front bumper air inlet to the oil cooler. For example, a structure described in Japanese Unexamined Patent Publication No. 2000-177406 (JP2000-177406A) has an air intake passage forming member installed between the front bumper and the oil cooler, and an oil cooler air guide for guiding cooling airflow to the oil cooler is installed in the air intake passage forming member.

A point of interest in this regard is that shape and size of the front bumper air guide opening are decided with consideration to design and air resistance of front of the vehicle. Since area of the air guide opening is therefore subject to restriction, adequate cooling air quantity is difficult to ensure with a structure that, as described in JP2000-177406A, introduces cooling airflow solely through a front bumper air guide opening.

SUMMARY OF THE INVENTION

An aspect of the present invention is a vehicle heat exchange apparatus, including: a heat exchanger provided rearward of a front bumper formed with an air intake port, and having an air inlet member on a front face of the heat exchanger; and a duct member provided between the front bumper and the heat exchanger, and forming a passage for passing cooling air from the air intake port of the front bumper to the air inlet member of the heat exchanger, wherein the duct member has: a first intake port introducing air from a vehicle front side into the passage through the air intake port provided in the front bumper; a second intake port introducing air from a vehicle lower side into the passage; and an outlet port opened at an end portion of the passage and facing the air inlet member of the heat exchanger.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present is explained with reference to FIGS. 1 to 8 in the following. The vehicle heat exchange apparatus according this embodiment of the present invention comprises an air-cooled heat exchanger installed behind a front bumper and is configured to guide cooling airflow to this heat exchanger from outside the vehicle. One example of a heat exchanger usable in the present embodiment is an ATF cooler for cooling ATF (Automatic Transmission Fluid), i.e., hydraulic oil and lubricating oil of an automatic transmission. ATF can also be used as a coolant oil for cooling, for example, an electric motor or the like installed inside a transmission case. This can be seen from the fact that electric motors used as vehicle power sources in hybrid vehicles, electric vehicles and the like are cooled using ATF.

Figure 1:
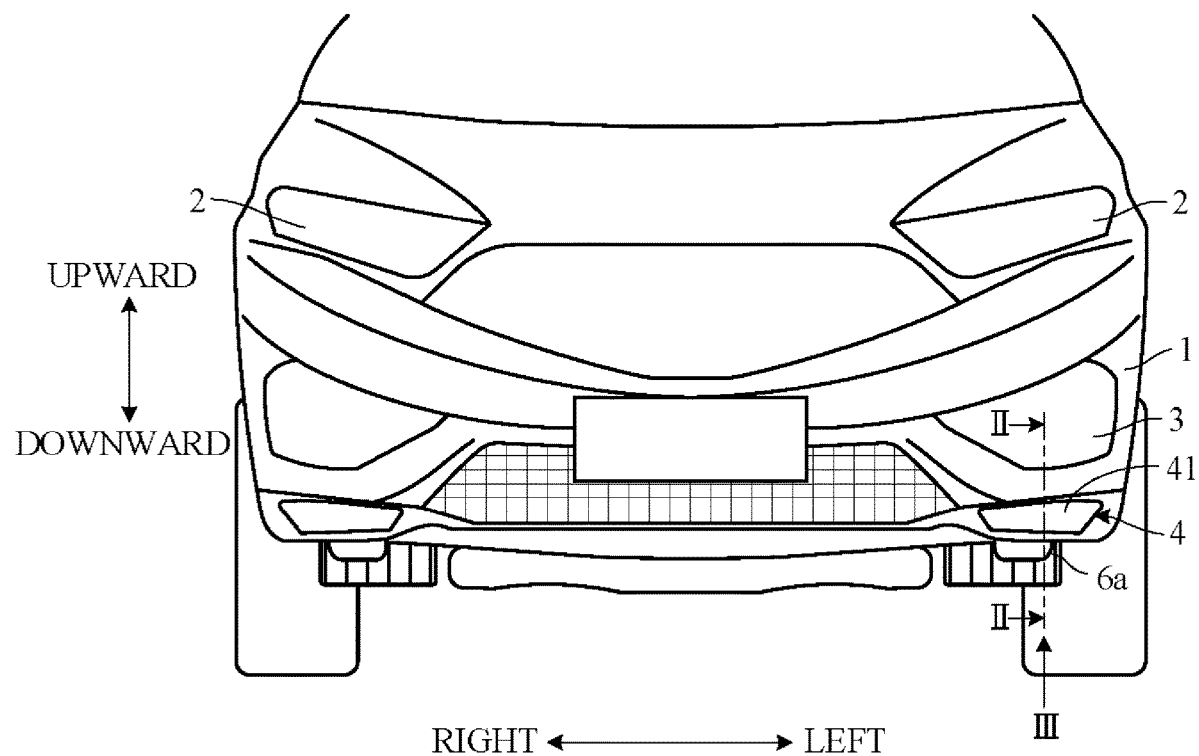
FIG. 1 is a front view of a vehicle to which a vehicle heat exchange apparatus according to an embodiment of the present invention is applied.
Figure 2:
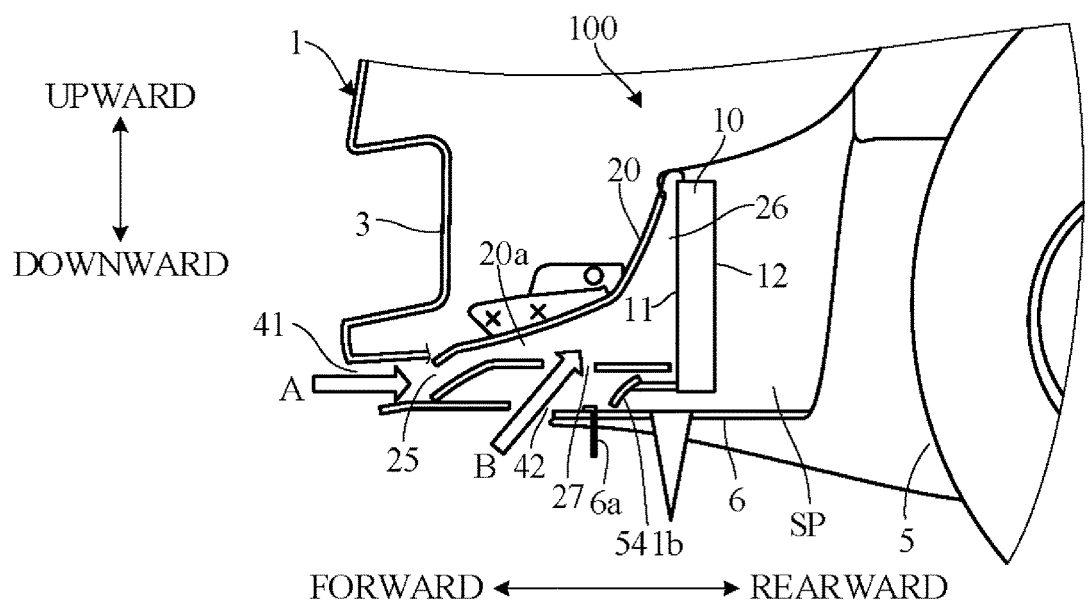
FIG. 2 is a cross-sectional view of an essential part cut along line II-II of FIG. 1.

FIG. 1 is a front view of a vehicle to which a vehicle heat exchange apparatus 100 according the present invention is applied, and FIG. 2 is a cross-sectional view of an essential part of the vehicle taken along line II-II of FIG. 1. For convenience in the following, vehicle forward-rearward direction (longitudinal direction), left-right direction (lateral direction) and upward-downward direction (vertical direction) are defined as seen in the drawings and components are explained in accordance with this definition. Upward-downward direction is gravity direction.

As shown in FIG. 1, a front bumper 1 is attached to the front of the vehicle to extend below headlights 2. The front bumper 1 is laterally symmetrical, and its front surface is smoothly formed substantially arcuate (convex surface-like) in forward-rearward direction from a laterally middle portion to opposite lateral end portions. Therefore, the lateral middle portion of the front bumper 1 is located farthest forward and the opposite lateral end portions thereof are located farthest rearward (see FIG. 3). Component mounts 3 for mounting fog lamps or other electrical components are provided at the left and right end portions of the front bumper 1, and air intake ports 4 (front intake ports 41) are formed under the component mounts 3.

As shown in FIG. 2, the front intake ports 41 are through-holes passing through the front bumper 1 in forward-rearward direction, and an ATF cooler 10 is installed rearward of the left side front intake port 41 and forward of a left front wheel 5. More specifically, an under-cover 6 is attached to a bottom face of the front bumper 1, and the ATF cooler 10 (heat exchanger) is erectly installed in a housing space SP rearward of the front bumper 1 and upward of the under-cover 6.

The ATF cooler 10 is connected to an automatic transmission (not shown). In the present embodiment, the ATF cooler 10 is installed behind the left side front intake port 41 taking into consideration, for example, ease of routing piping for interconnecting the ATF cooler 10 and the automatic transmission. The ATF cooler 10 can alternatively be installed at some other location (e.g., behind the right end portion of the front bumper 1) depending on where the automatic transmission is installed. The ATF cooler 10 is substantially rectangular viewed from the front and its thickness (forward-rearward direction length) is substantially constant throughout (both vertically and laterally).

Between the front bumper 1 and the ATF cooler 10 is provided a duct member 20 formed with a passage 20a for guiding to the front face of the ATF cooler 10 cooling airflow (arrow A in FIG. 2) introduced from ahead of the vehicle through the front intake port 41 into the housing space SP. Thus, the vehicle heat exchange apparatus 100 according to the present embodiment comprises the ATF cooler 10 and the duct member 20.

Figure 3:
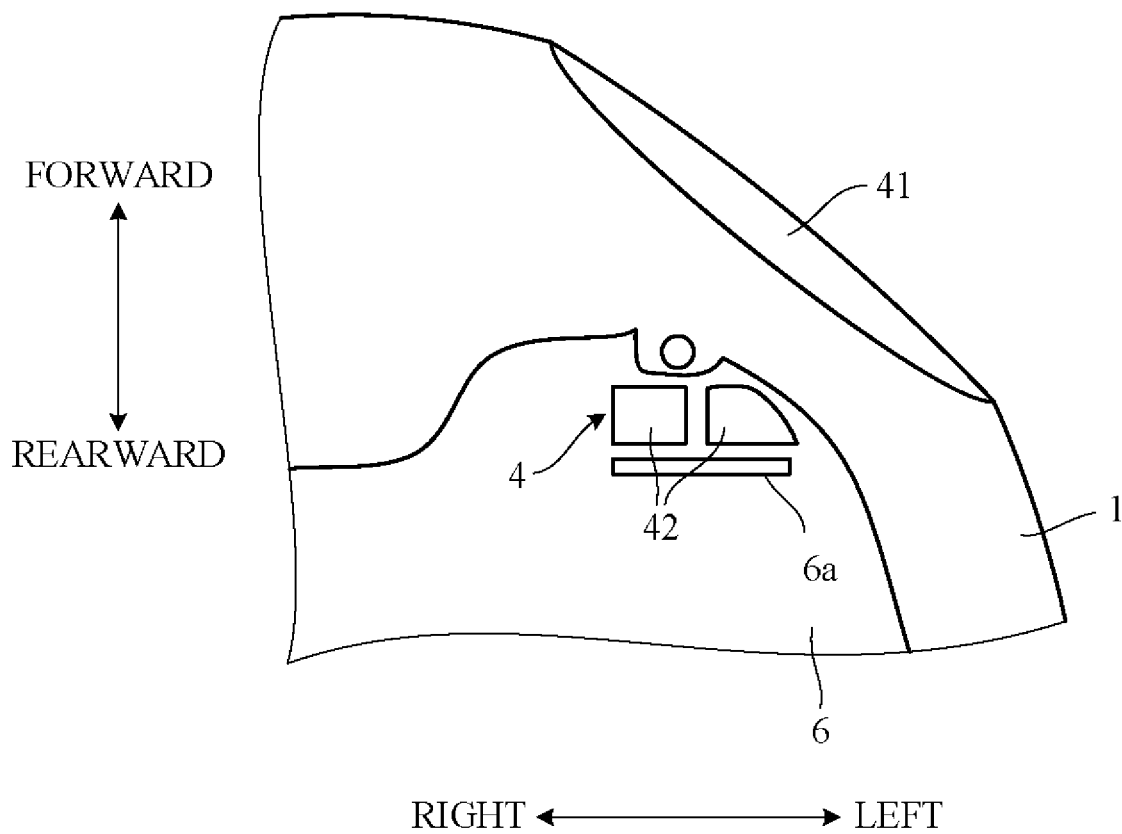
FIG. 3 is a view on arrow III of FIG. 1.

FIG. 3 is a diagram showing a left-front portion of the vehicle as viewed from below (view on arrow III of FIG. 1). As shown in FIG. 3, the front intake port 41 is provided at a rearwardly inclined left end portion of the front bumper 1. Left and right air intake ports 4 (lower intake ports 42) are formed in the under-cover 6 rearward of the front intake port 41.

As shown in FIG. 2, cooling airflow from underneath the vehicle is taken into the passage 20a of the duct member 20 through the lower intake ports 42 (arrow B), whereby cooling airflow from underneath the vehicle can be guided to the front face of the ATF cooler 10. As shown in FIGS. 1 to 3, a downwardly protruding strake (plate member) 6a is provided on the under-cover 6 rearward of the lower intake ports 42, whereby introduction of cooling airflow into the housing space SP above the under-cover 6 is promoted by the strake 6a.

Figure 4:
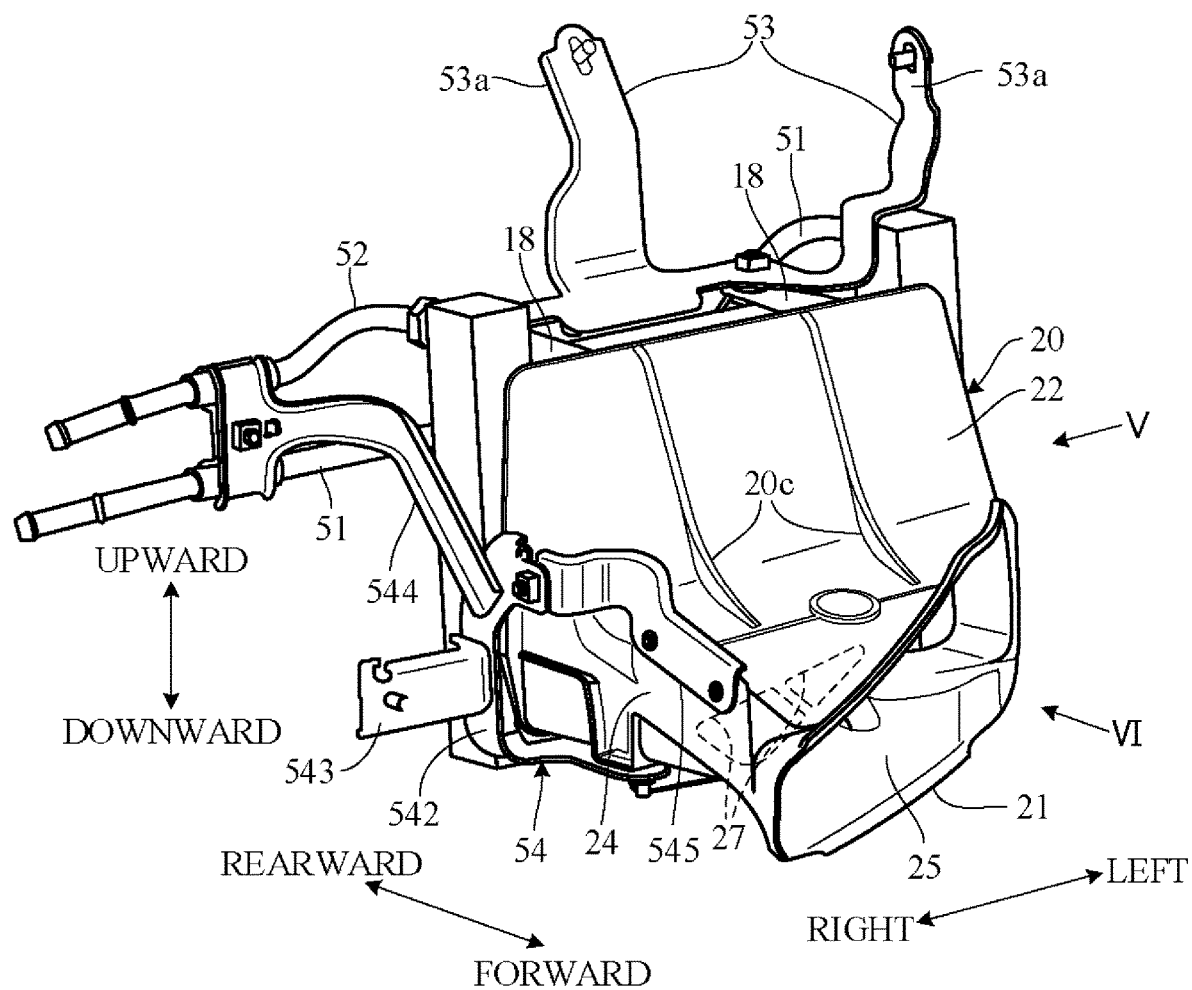
FIG. 4 is a perspective front view of the vehicle heat exchange apparatus according to the embodiment of the present invention, viewed obliquely from the right.
Figure 5:
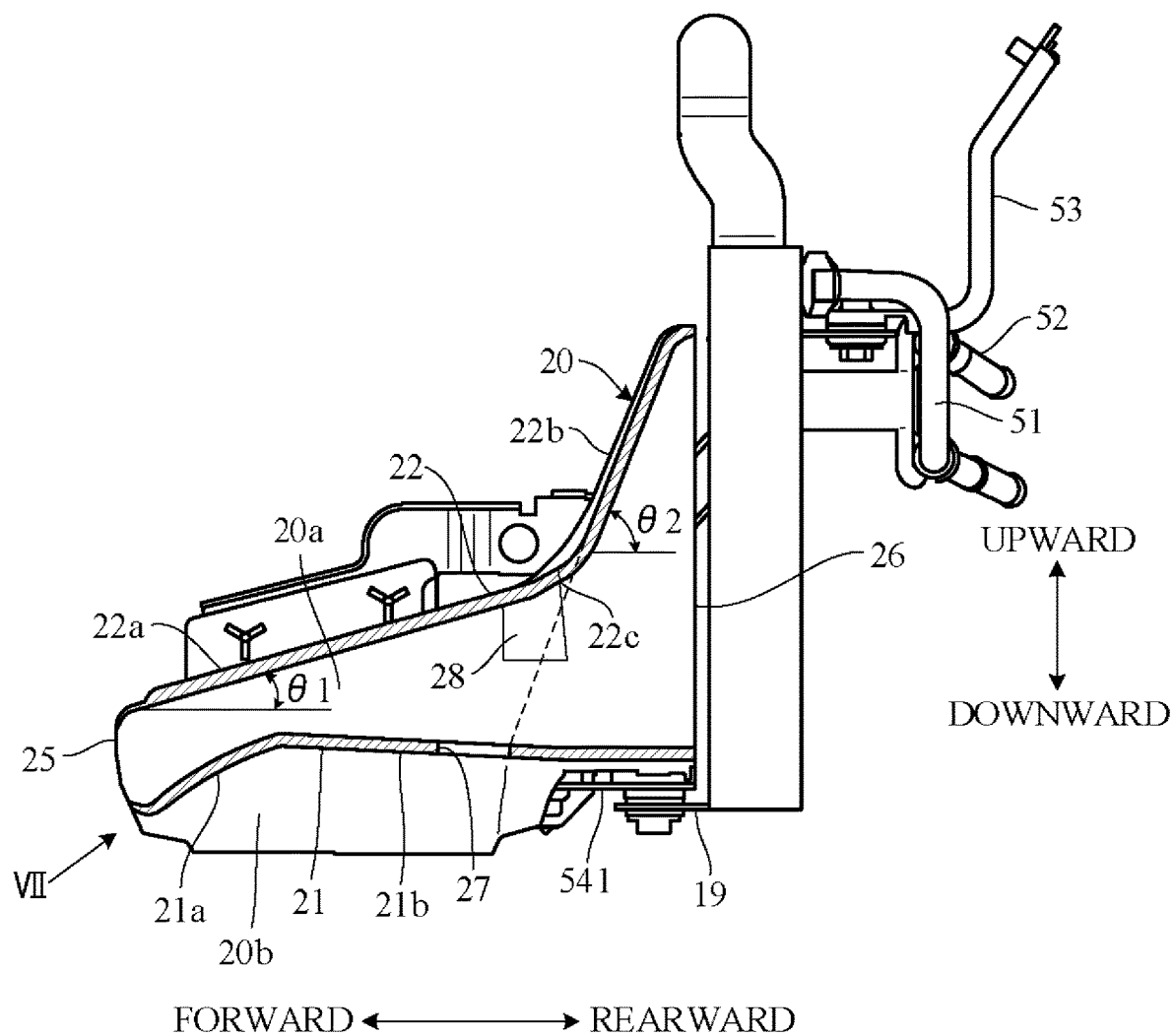
FIG. 5 is a view on arrow V of FIG. 4.
Figure 6:
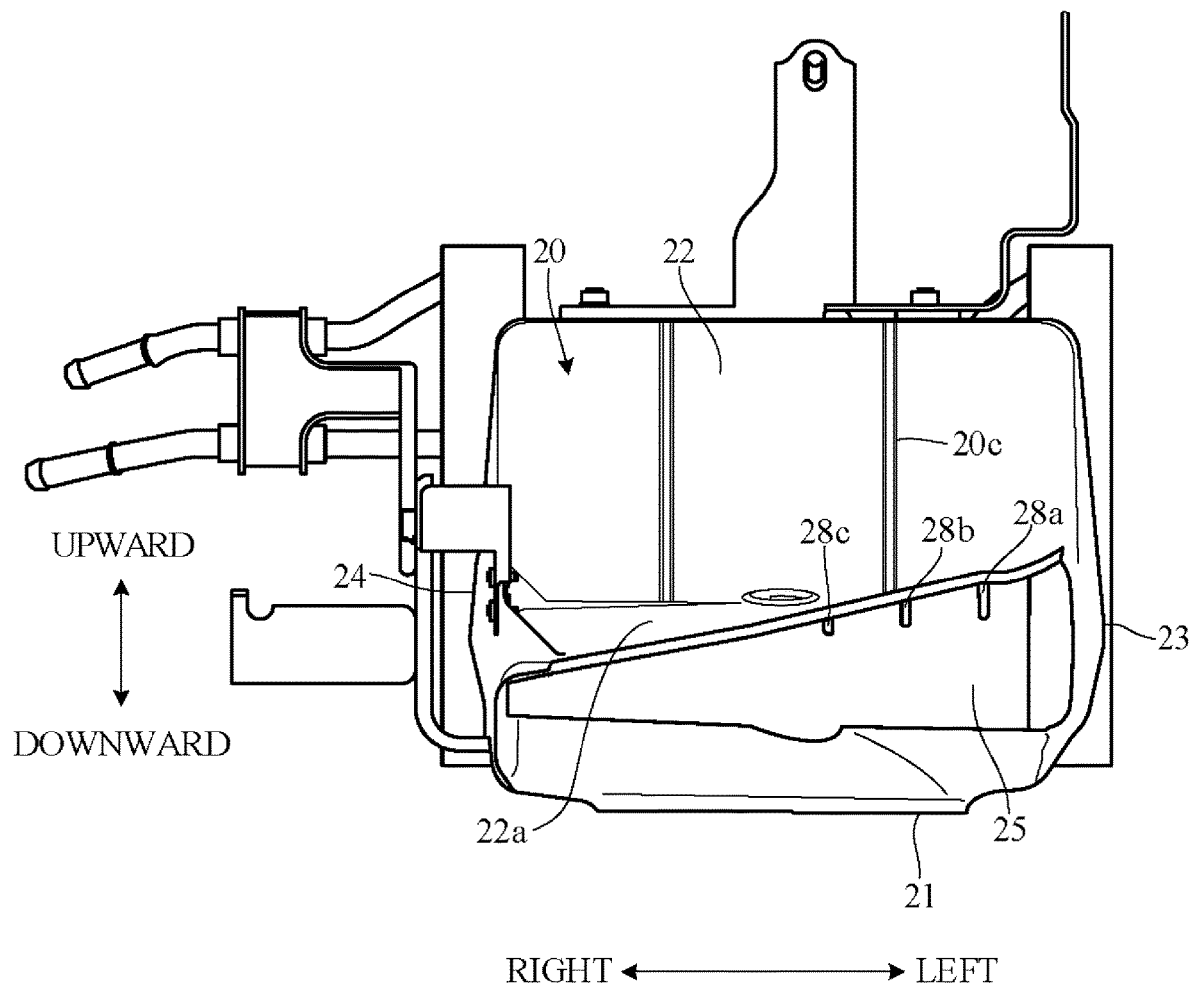
FIG. 6 is a view on arrow VI of FIG. 4.
Figure 7:
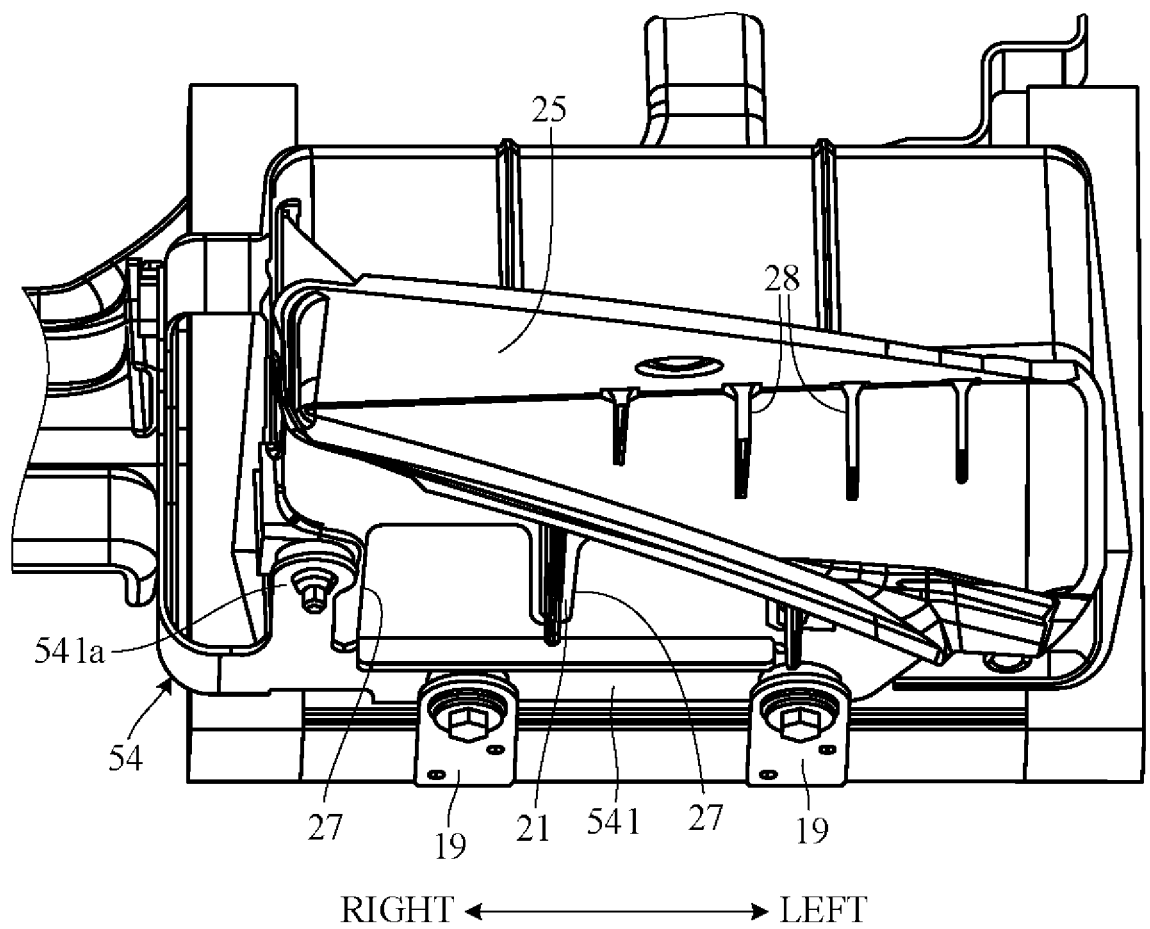
FIG. 7 is a view on arrow VII of FIG. 5.
Figure 8:
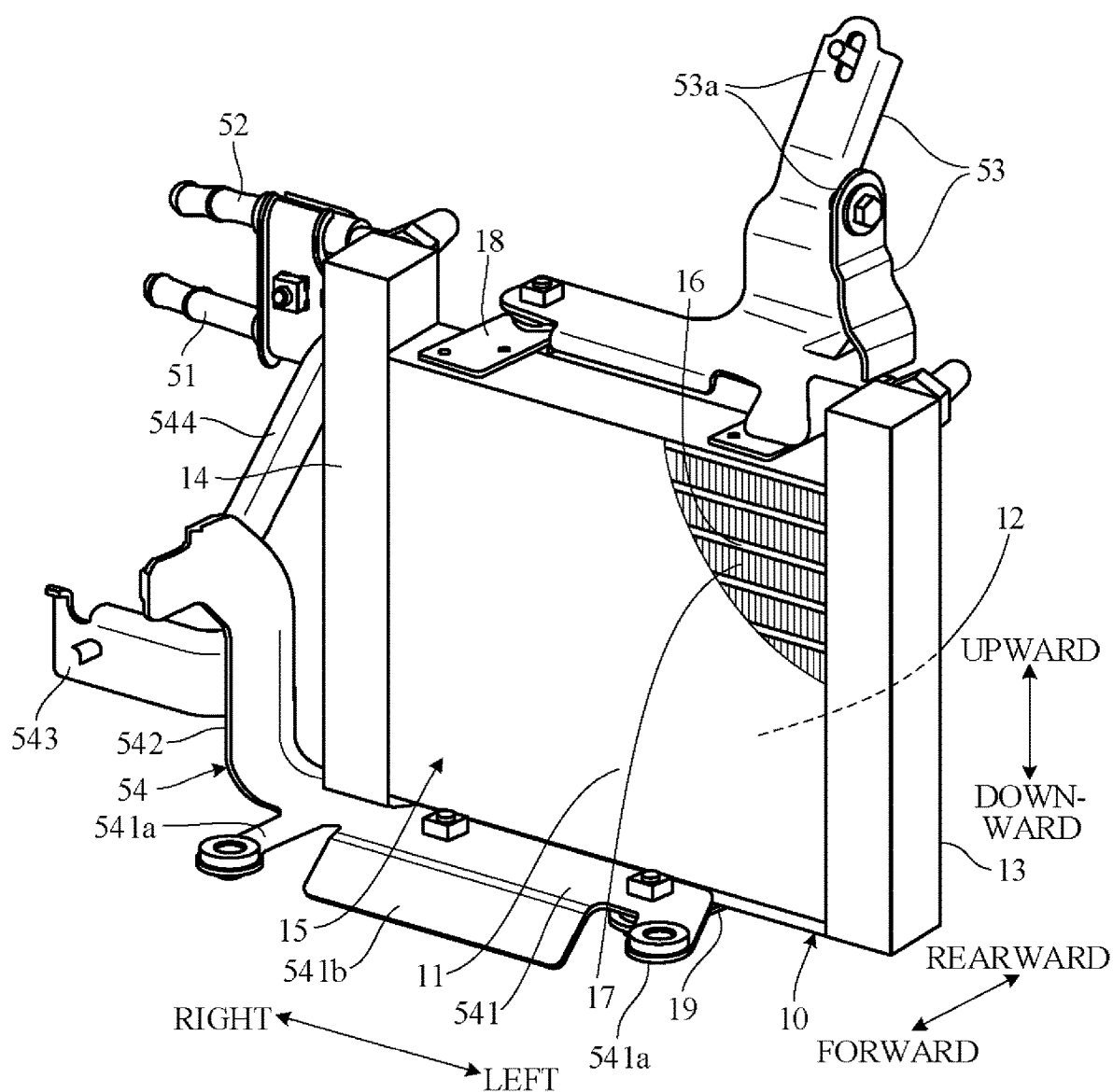
FIG. 8 is a perspective view showing the vehicle heat exchange apparatus of FIG. 4 in a state with a duct member detached.

The structure of the vehicle heat exchange apparatus 100 is explained in greater detail in the following. FIG. 4 is a perspective view of the vehicle heat exchange apparatus 100 seen obliquely from the right front; FIGS. 5 and 6 are respectively a left side view (view on arrow V of FIG. 4) and a front view (view on arrow VI of FIG. 4) of the vehicle heat exchange apparatus 100; FIG. 7 is perspective front view of the vehicle heat exchange apparatus 100 as seen obliquely from below (view on arrow VII of FIG. 5); and FIG. 8 is a perspective view showing the vehicle heat exchange apparatus 100 in a state with the duct member 20 detached, i.e., showing chiefly the structure of the ATF cooler 10. To be more precise, FIG. 5 is a partial view of the vehicle heat exchange apparatus 100, namely, a cross-sectional view showing internal structure of the duct member 20.

As shown in FIG. 8, the ATF cooler 10 has a substantially rectangular air inlet 11 on its front face and a substantially rectangular air outlet 12 on its rear face, and the air inlet 11 is arranged to face forward. Further, the ATF cooler 10 has a pair of left and right header pipes 13 and 14, and a cooler core 15 provided inward of the left and right header pipes 13 and 14.

The cooler core 15 extends laterally and its opposite lateral ends are connected to the left and right header pipes 13 and 14. The cooler core 15 comprises multiple parallel arranged, vertically equispaced tubes 16 (only a few visible), and fins 17 (only a few visible) disposed between adjacent tubes 16, which tubes and fins are present over the entire width of the cooler core 15. The air inlet 11 and the air outlet 12 are provided on the front face and rear face of the cooler core 15. AFT is cooled in the ATF cooler 10 by heat exchange with cooling airflow passing through the cooler core 15 from front to rear.

A pipe 51 for inflow of ATF to the ATF cooler 10 and a pipe 52 for outflow of ATF from the ATF cooler 10 are connected to upper ends of the left and right header pipes 13 and 14, respectively. As shown in FIGS. 4 and 5, the pipes 51 and 52 extend farther to the right behind the ATF cooler 10. The pipes 51 and 52 run in parallel rightward of the ATF cooler 10.

As shown in FIGS. 4 and 8, stays 18 are provided to project rearward from the upper end of the cooler core 15 of the ATF cooler 10, and an upper bracket 53 is fastened to the stays 18. The upper bracket 53 extends upward and its upper end is provided with cooler support members 53a. A top portion of the ATF cooler 10 is connected through the upper bracket 53 (cooler support members 53a) to be supported by an unshown vehicle body frame.

As shown in FIGS. 7 and 8, forwardly protruding stays 19 are provided on a lower end portion of the cooler core 15 of the ATF cooler 10, and a lower bracket 54 is fastened to the stays 19. As shown in FIGS. 4 and 8, the lower bracket 54 comprises a forwardly protruding bottom wall 541, a side wall 542 extending upward from a right end portion of the bottom wall 541 and rightward of the ATF cooler 10, a cooler support member 543 protruding rightward from a right face of the side wall 542, a pipe support member 544 extending rearward from the side wall 542 to support the pipes 51 and 52, and a duct support member 545 attached to and extending forward from a forward end portion of the side wall 542. The cooler support member 543 is attached to the unshown vehicle body frame, and a lower part of the ATF cooler 10 is supported by the vehicle body frame through the lower bracket 54 (cooler support member 543).

As shown in FIG. 8, left and right duct support members 541a are provided on the bottom wall 541 of the lower bracket 54 so as to protrude forward at its opposite lateral ends, and a strake (plate member) 541b is provided between the left and right duct support members 541a. As shown in FIG. 2, the strake 541b slopes downwardly forward, so that the strake 541b promotes inflow of cooling air from underneath the vehicle into the duct member 20 (arrow B in FIG. 2).

As shown in FIGS. 4 and 6, the duct member 20 comprises a bottom surface part 21, a top surface part 22 facing the bottom surface part 21, and left and right side surface parts 23 and 24 that interconnect the bottom surface part 21 and top surface part 22. As shown in FIG. 2, a front face and rear face of the duct member 20 are formed with a front opening 25 and a rear opening 26, whereby the passage 20a is formed inside the duct member 20 to extend from the front opening 25 to the rear opening 26. Further, as shown in FIGS. 4 and 5, ribs 20b and 20c are provided to protrude downward from the bottom surface part 21 and upward from the top surface part 22, respectively.

As shown in FIG. 7, left and right bottom surface openings 27 are additionally formed in the bottom surface part 21 of the duct member 20 so as to face the left and right lower intake ports 42 (FIG. 3), and the passage 20a (FIG. 2) is formed inside the duct member 20 to extend from the bottom surface openings 27 to the rear opening 26. Since cooling airflow can therefore be taken into the duct member 20 from both the front opening 25 and the bottom surface openings 27, quantity of cooling air taken into the duct member 20 can be increased.

The rear opening 26 of the duct member 20 opposes the front face of cooler core 15 of the ATF cooler 10 so as to completely cover the air inlet 11. As a result, upper and lower ends and left and right ends of the rear opening 26 of the duct member 20 and upper and lower ends and left and right ends of the cooler core 15 are located at substantially coincident vertical and lateral positions. Cooling airflow guided through the duct member 20 therefore passes through the cooler core 15 over its entire extent.

As shown in FIG. 4, the right side surface part 24 of the duct member 20 is fastened to the duct support member 545 of the lower bracket 54. Moreover, as shown in FIG. 7, the bottom surface part 21 of the duct member 20 is fastened to the left and right duct support members 541a (FIG. 8) of the lower bracket 54. As a result, the duct member 20 is supported by the unshown vehicle body frame through the lower bracket 54.

As shown in FIG. 5, the bottom surface part 21 of the duct member 20 comprises a sloped portion 21a that extends obliquely upward from a lower end portion of the front opening 25 and a horizontal portion 21b that extends rearward from a rear end of the sloped portion 21a to a lower end portion of the of the rear opening 26, and the bottom surface openings 27 are provided in the horizontal portion 21b. On the other hand, the top surface part 22 of the duct member 20 comprises a sloped portion 22a that extends obliquely upward from an upper end portion of the front opening 25 and a sloped portion 22b that extends rearward from a rear end portion of the sloped portion 22a to an upper end portion of the rear opening 26.

Angle $\theta2$ of the sloped portion 22b with respect to horizontal is greater than angle $\theta1$ of the sloped portion 22a with respect to horizontal. Therefore, passage area abruptly expands starting from an intersection line 22c between the sloped portion 22a and the sloped portion 22b. The bottom surface openings 27 are located forward of the intersection line 22c. More specifically, the sloped portion 22b is formed along an imaginary straight plane connecting the upper end portion of the rear opening 26 and a rear end portion of the bottom surface openings 27. Therefore, an imaginary plane (represented by a dotted line) obtained by extending the top surface part 22 plane passes through the rear end portion of the bottom surface openings 27.

As shown in FIG. 4, the front opening 25 of the duct member 20 is formed to incline rearward from a right end portion to a left end portion, whereby the right end portion comes to be positioned more forward than the left end portion. In other words, the front opening 25 is formed to incline in forward-rearward direction in correspondence to the associated front intake port 41 of the front bumper 1 being formed to incline in forward-rearward direction as seen in FIG. 3. Therefore, as seen in FIG. 6, the upper end portion of the front opening 25 inclines gradually upward along the sloped portion 22a from the right end portion to the left end portion, so that opening area of the front opening 25 gradually increases toward the left.

On the other hand, as shown in FIGS. 4 and 7, the bottom surface openings 27 of the duct member 20 are formed to gradually shrink in opening area from a right end portion to a left end portion of the bottom surface part 21. In other words, contrary to the front opening 25, the bottom surface openings 27 are formed to gradually increase in opening area toward the right end portion.

As shown in FIGS. 5 and 6, multiple laterally equispaced fins 28 are formed to protrude downward from an inner wall surface of the sloped portion 22a. The fins 28 function to minimize damage to the ATF cooler 10 by invasion of stones and other foreign objects into the duct member 20 through the front opening 25, i.e., to enhance durability of the ATF cooler 10 against chipping (by flying stones; anti-chipping property). The result of providing the fins 28 is that the ATF cooler 10 can be protected by preventing foreign objects of greater than a certain size from colliding with the front face of the cooler core 15. Each fin 28 is a thin plate of predetermined lateral direction thickness and, similarly to the fins 17 of the cooler core 15 (FIG. 8), extend in forward-rearward direction. Owing to this provision of the fins 28 to extend in forward-rearward direction, the fins 28 can also help to inhibit cooling airflow turbulence.

In the front view of FIG. 6, three fins 28a to 28c can be seen inward of the front opening 25. As shown in FIG. 6, amount of protrusion of the fins 28 from the upper end portion of the front opening 25 increases toward the left. In other words, when amount of protrusion of the fins 28a to 28c as viewed from the front is compared, the fin 28a on the left side protrudes most and the fin 28c on the right side protrudes least. By setting vertical length of the fins 28 so that amount of protrusion increases with increasing area (vertical length) of the front opening 25 in this manner, it becomes possible to prevent foreign objects of greater than a predetermined size from colliding with the cooler core 15, while also exploiting the synergistic effect of inhibiting cooling airflow turbulence by the provision of the fins 28, without requiring the fins 28 to be lengthened more than necessary.

The vehicle heat exchange apparatus 100 according to the present embodiment operates follows. As shown in FIG. 2, during vehicle running, cooling airflow from the front of the vehicle enters through the left front intake port 41 of the front bumper 1 and the associated front opening 25 and flows into the duct member 20 (arrow A). In addition, cooling air from underneath the vehicle enters through the lower intake ports 42 of the under-cover 6 and the bottom surface openings 27 and flows into the duct member 20 (arrow B). Since abundant cooling airflow can therefore be introduced into the duct member 20, the ATF cooler 10 can adequately cool ATF.

Since, as shown in FIG. 3, the left end portion of the front bumper 1 is formed to incline obliquely left-rearward, velocity of the cooling airflow along the front bumper 1 is faster on the vehicle left side. Taking this into account, efficiency of cooling airflow intake into the duct member 20 is enhanced in the present embodiment by enlarging area (vertical length) of the front opening 25 toward the left as shown in FIG. 6.

As seen in FIG. 7, in the case of the bottom surface openings 27 of the duct member 20, unlike in the case of the front opening 25, area (forward-rearward direction length) is enlarged rightward. As a result, air turbulence caused by merging of cooling airflow from the bottom surface openings 27 (arrow B in FIG. 2) with cooling airflow from the front opening 25 (arrow A in FIG. 2) can be inhibited, whereby cooling airflow can be smoothly guided to the ATF cooler 10. Since opening area of the front opening 25 is large on the left side and opening area of the bottom surface openings 27 is large on the right side, cooling airflow can be guided to the ATF cooler 10 uniformly in lateral direction, thereby enabling the ATF cooler 10 to efficiently perform heat exchange.

As shown in FIG. 5, inclination of the sloped portion 22b of the top surface part 22 of the duct member 20 is larger than inclination of the sloped portion 22a thereof, and the bottom surface openings 27 are formed at locations falling on an extension of the sloped portion 22b plane. Since cooling air flowing in from the bottom surface openings 27 therefore merges with cooling air flowing in from the front opening 25 at a place where area of the passage 20a abruptly enlarges, air turbulence caused by merging of the cooling airflows can be effectively minimized. Namely, owing to the fact that the cooling airflow in the passage 20a obliquely from below along the sloped portion 22b merges at a place where flow of cooling air changes, effect of the merging of the cooling airflow from the bottom surface openings 27 on flow of cooling air from the front opening 25 can be kept to a minimum and thereby optimize heat exchange efficiency of the ATF cooler 10.

Since the fins 28 (longitudinal fins) are formed to protrude downward from an inner wall surface of the top surface part 22 of the duct member 20 as shown in FIGS. 5 and 6, anti-chipping property of the ATF cooler 10 can be improved. Moreover, the provision of the fins 28 also helps to inhibit cooling airflow turbulence inside the passage 20a. To the contrary, provision of fins extending in left-right direction (lateral fins), for example, would have the effect of increasing airflow turbulence in the passage 20a.

In front view of the duct member 20 (FIG. 6), protrusion amount of the fins 28 from the upper end portion of the front opening 25 increases toward the left. In other words, protrusion amount of the fins 28 is greater at places where the area of the front opening 25 is greater. As a result, collision of foreign objects of greater than a predetermined size with the front face of the ATF cooler 10 can be prevented to thereby enhance anti-chipping property of the ATF cooler 10, without making the fins 28 long.

The present embodiment can achieve advantages and effects such as the following:

(1) The vehicle heat exchange apparatus 100 includes: the ATF cooler 10 that is installed rearward of the front bumper 1 formed with the front intake port 41 and has the air inlet 11 on its front face; and the duct member 20 that is installed between the front bumper 1 and the ATF cooler 10 and is formed with the passage 20a for passing cooling airflow from the front intake port 41 to the air inlet 11 of the ATF cooler 10 (FIG. 2). The duct member 20 includes: the front opening 25 for introducing into the passage 20a air entering from the front of the vehicle through the front intake port 41 provided in the front bumper 1; the bottom surface openings 27 for introducing into the passage 20a air entering from underneath the vehicle through the lower intake ports 42 formed in the under-cover 6; and the rear opening 26 formed in a rear end portion of the passage 20a to face the air inlet 11 of the ATF cooler 10 (FIG. 2). Owing to air being introduced from the front opening 25 and the bottom surface openings 27 in this manner, quantity of cooling airflow guided to the ATF cooler 10 increases, whereby heat exchange quantity by the ATF cooler 10 can be increased to enable thorough cooling of ATF.

(2) The front opening 25 is formed to increase gradually in opening area toward the left side of the vehicle, while the bottom surface openings 27 are formed to decrease gradually in opening area toward the left side of the vehicle (FIGS. 6 and 7). This makes it possible to inhibit air turbulence at the place where cooling airflow from the bottom surface openings 27 merges with cooling airflow from the front opening 25, and also to guide cooling airflow to the ATF cooler 10 uniformly in lateral direction.

(3) The duct member 20 includes the bottom surface part 21 that extends from the lower end portion of the front opening 25 to the lower end portion of the rear opening 26 and is formed with the bottom surface openings 27, and the top surface part 22 that extends from the upper end portion of the front opening 25 to the upper end portion of the rear opening 26 (FIG. 5). The top surface part 22 includes the sloped portion 22a that extends from the upper end portion of the front opening 25 at a predetermined angle of inclination with respect to horizontal of $\theta1$ and the sloped portion 22b that extends from the rear end portion of the sloped portion 22a at a predetermined angle of inclination with respect to horizontal of $\theta2$ larger than inclination angle $\theta1$ and along an imaginary plane connecting the bottom surface openings 27 and the upper end portion of the rear opening 26 (FIG. 5). Owing to this configuration, air turbulence caused by introduction of cooling airflow from the bottom surface openings 27 can be kept to a minimum.

(4) The duct member 20 has multiple fins 28 arranged in vehicle width direction that are formed to protrude vertically from the inner wall surface thereof and (FIG. 7). As a result, anti-chipping property of the ATF cooler 10 can be improved, while also inhibiting air turbulence thanks to the provision of the fins 28.

(5) The multiple fins are formed so that their amount of downward protrusion from the upper end portion of the front opening 25 in front view of the duct member 20 increases with increasing vertical direction opening length of the front opening 25 (FIG. 6). As a result, protrusion amount of the fins 28 can be held to the minimum required, and cooling airflow turbulence can be inhibited owing to the provision of the fins 28.

Although the aforesaid embodiment represents an example in which the vehicle heat exchange apparatus 100 utilizes the ATF cooler 10, the present invention can also utilize an intercooler or other type of air-cooled heat exchanger. Moreover, the heat medium used in the vehicle heat exchanger is not limited ATF but can be of another type. The vehicle heat exchange apparatus need not be installed at the left end portion of the vehicle but can instead be installed at the right end portion, a lateral middle portion or some other part of the vehicle. The number of air intake ports 4 (front intake ports 41) on the front of the front bumper 1 is not limited to that in the aforesaid embodiment, and, for example, provision of two air intake ports above and below each other is also possible. In the aforesaid embodiment, the lower intake ports 42 are provided in the under-cover 6, but it is possible instead to provide both the front intake ports 41 and the lower intake ports 42 in the front bumper 1.

In the aforesaid embodiment, the front opening 25 is provided in the duct member 20 so as to enlarge in opening area toward the left, and the bottom surface openings 27 are provided so as to shrink in opening area toward the left, but the first inlet for introducing air into the passage inside the duct member from ahead of the vehicle and the second inlet for introducing air into the passage from underneath the vehicle are not limited to this configuration. In the aforesaid embodiment, the top surface part 22 comprises the sloped portion 22a (first top surface section) that extends from the upper end portion of the front opening 25 at the predetermined inclination angle (first inclination angle) $\theta1$ and the sloped portion 22b (second top surface section) that extends from the rear end portion of the sloped portion 22a to the upper end portion of the rear opening 26 (outlet) at the predetermined inclination angle (second inclination angle) $\theta2$ larger than $\theta1$, but the upper surface part of the duct member is not limited to this configuration.

The above embodiment can be combined as desired with one or more of the above modifications. The modifications can also be combined with one another.

According to the present invention, it is possible to introduce air from the front and bottom of the vehicle into the duct member through the first inlet and the second inlet, whereby ensuring adequate amount of cooling air for the heat exchanger to increase heat exchange quantity of the heat exchanger.

Above, while the present invention has been described with reference to the preferred embodiments thereof, it will be understood, by those skilled in the art, that various changes and modifications may be made thereto without departing from the scope of the appended claims.

What is claimed is:

1. A vehicle heat exchange apparatus, comprising:
a heat exchanger provided rearward of a front bumper formed with an air intake port, and having an air inlet member on a front face of the heat exchanger; and
a duct member provided between the front bumper and the heat exchanger, and forming a passage for passing cooling air from the air intake port of the front bumper to the air inlet member of the heat exchanger, wherein the duct member has:
a first intake port introducing air from a vehicle front side into the passage through the air intake port provided in the front bumper;
a second intake port introducing air from a vehicle lower side into the passage; and
an outlet port opened at an end portion of the passage and facing the air inlet member of the heat exchanger, wherein
the first intake port is formed to gradually increase in opening area toward outside in a vehicle width direction, while the second intake port is formed to gradually decrease in opening area toward the outside in the vehicle width direction.

2. A vehicle heat exchange apparatus, comprising:
a heat exchanger provided rearward of a front bumper formed with an air intake port, and having an air inlet member on a front face of the heat exchanger; and
a duct member provided between the front bumper and the heat exchanger, and forming a passage for passing cooling air from the air intake port of the front bumper to the air inlet member of the heat exchanger, wherein the duct member has:
a first intake port introducing air from a vehicle front side into the passage through the air intake port provided in the front bumper;
a second intake port introducing air from a vehicle lower side into the passage; and
an outlet port opened at an end portion of the passage and facing the air inlet member of the heat exchanger, wherein
the duct member has a plurality of fins vertically extended from an inner wall surface of the duct member and arranged in a vehicle width direction, wherein
the plurality of fins is formed so that a protrusion amount downward from an upper end portion of the first intake port when viewing the first intake port from the vehicle front side increases with increasing vertical opening length of the first intake port, wherein
the first intake port is formed to gradually increase in opening area toward outside in the vehicle width direction, while the second intake port is formed to gradually decrease in opening area toward the outside in the vehicle width direction.

3. The vehicle heat exchange apparatus according to claim 1, wherein the duct member has:

a bottom surface portion extending from a lower end portion of the first intake port to a lower end portion of the outlet port, and opened with the second intake port; and
a top surface portion extending from an upper end portion of the first intake port to an upper end portion of the outlet port, and
the top surface portion has a first top surface portion extending from the upper end portion of the first intake port at a first inclination angle with respect to horizontal, and a second top surface portion extending from a rear end portion of the first top surface portion at a second inclination angle larger than the first inclination angle with respect to horizontal and along an imaginary straight line connecting the second intake port and the upper end portion of the outlet port.

4. The vehicle heat exchange apparatus according to claim 3, wherein
the duct member is provided above an under-cover of a vehicle,
the air intake port is a first air intake port, and
the under-cover has a second air intake port facing the second intake port.

5. The vehicle heat exchange apparatus according to claim 4, wherein
the bottom surface portion has an inclined portion inclined obliquely upward from the lower end portion of the first intake port, a horizontal portion extending from a rear end portion of the inclined portion to the lower end portion of the outlet port, and the second intake port opened in the horizontal portion.

6. The vehicle heat exchange apparatus according to claim 5, wherein
a plate member supported by a lower end portion of the heat exchanger and extending obliquely downward to the vehicle front side to promote a cooling airflow into the duct member through the second intake port is provided between the horizontal portion and the under-cover.

7. The vehicle heat exchange apparatus according to claim 4, wherein
a plate member protruded downward to promote a cooling airflow passing the second air intake port is protruded rearward of the second air intake port.

8. The vehicle heat exchange apparatus according to claim 1, wherein
the duct member has a plurality of fins vertically extended from an inner wall surface of the duct member and arranged in the vehicle width direction.

9. The vehicle heat exchange apparatus according to claim 8, wherein
the plurality of fins is formed so that a protrusion amount downward from an upper end portion of the first intake port when viewing the first intake port from the vehicle front side increases with increasing vertical opening length of the first intake port.

10. The vehicle heat exchange apparatus according to claim 1, wherein
the heat exchanger is an ATF cooler for cooling hydraulic oil or lubricating oil of an automatic transmission.

* * * * *